(12) United States Patent
Yamagiwa

(10) Patent No.: US 6,532,219 B1
(45) Date of Patent: Mar. 11, 2003

(54) TRANSMISSION RESERVATION IN MOBILE SATELLITE COMMUNICATION SYSTEM

(75) Inventor: Hirofumi Yamagiwa, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/251,437

(22) Filed: Feb. 17, 1999

(30) Foreign Application Priority Data

Feb. 20, 1998 (JP) .......................................... 10-039261

(51) Int. Cl.[7] .............................................. H04B 7/185
(52) U.S. Cl. ...................................... 370/316; 455/12.1
(58) Field of Search ............................... 370/316, 321, 370/322, 348, 443; 455/12.1, 13.1, 427

(56) References Cited

U.S. PATENT DOCUMENTS

| | | | |
|---|---|---|---|
| 5,274,626 A | 12/1993 | Hotta et al. ................... | 370/31 |
| 5,299,188 A | 3/1994 | Hotta et al. ................... | 370/31 |
| 5,757,790 A * | 5/1998 | Taketsugu ..................... | 370/342 |
| 5,943,324 A * | 8/1999 | Ramesh et al. .............. | 370/321 |
| 6,226,492 B1 * | 5/2001 | Tsuda ........................... | 455/12.1 |

FOREIGN PATENT DOCUMENTS

| | | |
|---|---|---|
| JP | 59-28301 | 7/1984 |
| JP | 1-168126 | 7/1989 |
| JP | 2-298127 | 12/1990 |
| JP | 3-62329 | 9/1991 |
| JP | 4-256231 | 9/1992 |

* cited by examiner

Primary Examiner—William Trost
Assistant Examiner—Sharad Rampuria
(74) Attorney, Agent, or Firm—Foley & Lardner

(57) ABSTRACT

A mobile satellite communication system includes a plurality of mobile stations, and a base station apparatus connected to the plurality of mobile stations through a communication satellite. The base station apparatus performs transmission to the plurality of mobile stations using a single downward control channel and reception from the plurality of mobile stations using a single upward control channel. Each of the plurality of mobile stations performs a short burst transmission requesting long burst transmissions. The base station includes a control unit that transmits a collision control signal, including a PE signal based on a maximum allowable transmission reservation count and based on the transmission reservation count, in response to the requesting short burst transmissions.

16 Claims, 9 Drawing Sheets

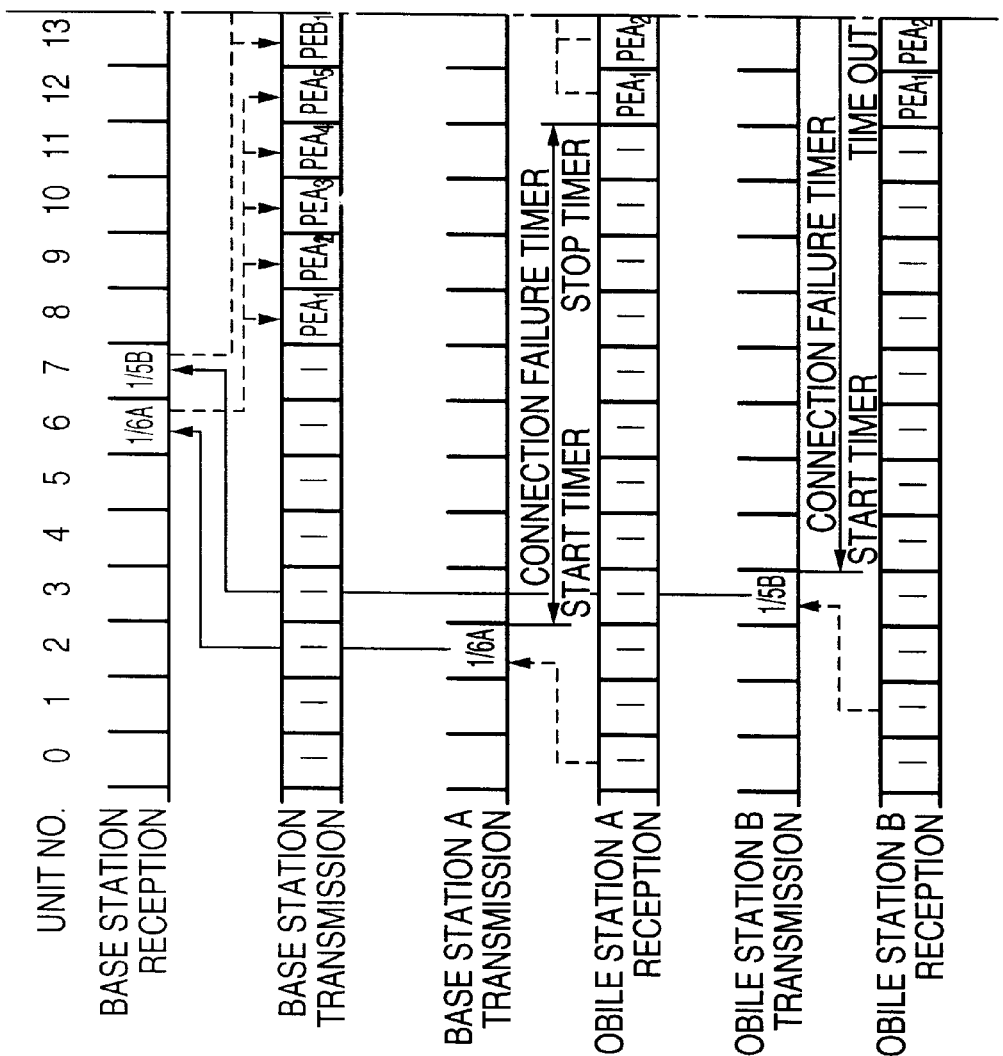

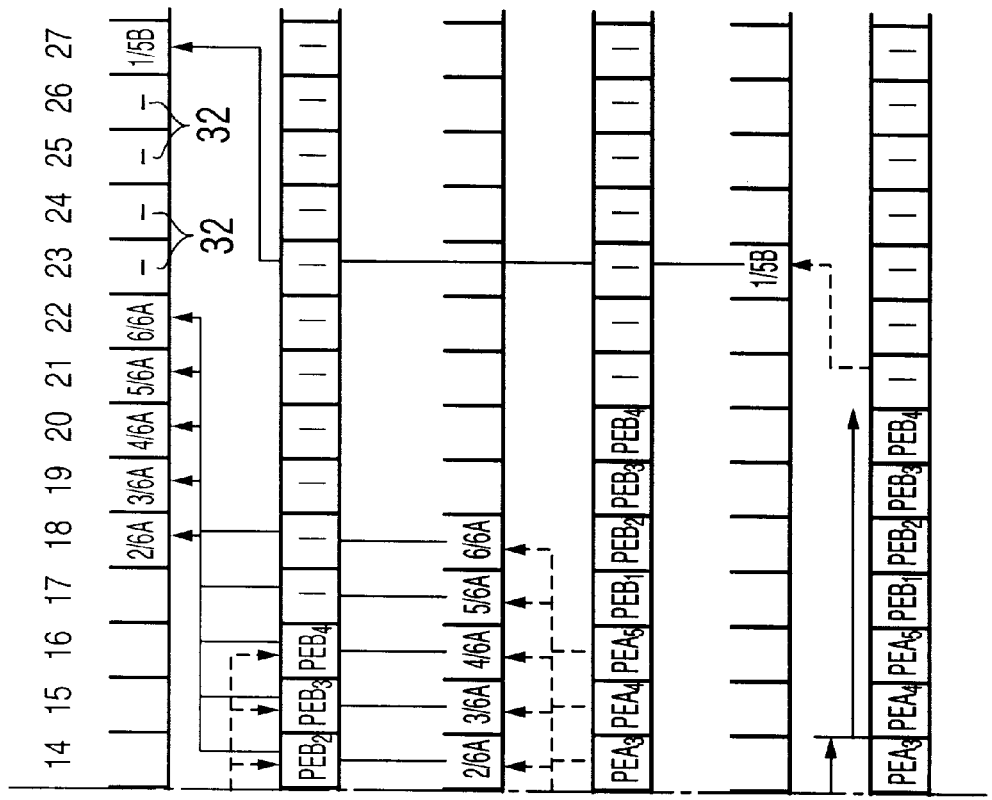

Fig. 5A-1
Fig. 5B-1
Fig. 5C-1
Fig. 5D-1
Fig. 5E-1
Fig. 5F-1
Fig. 5G-1

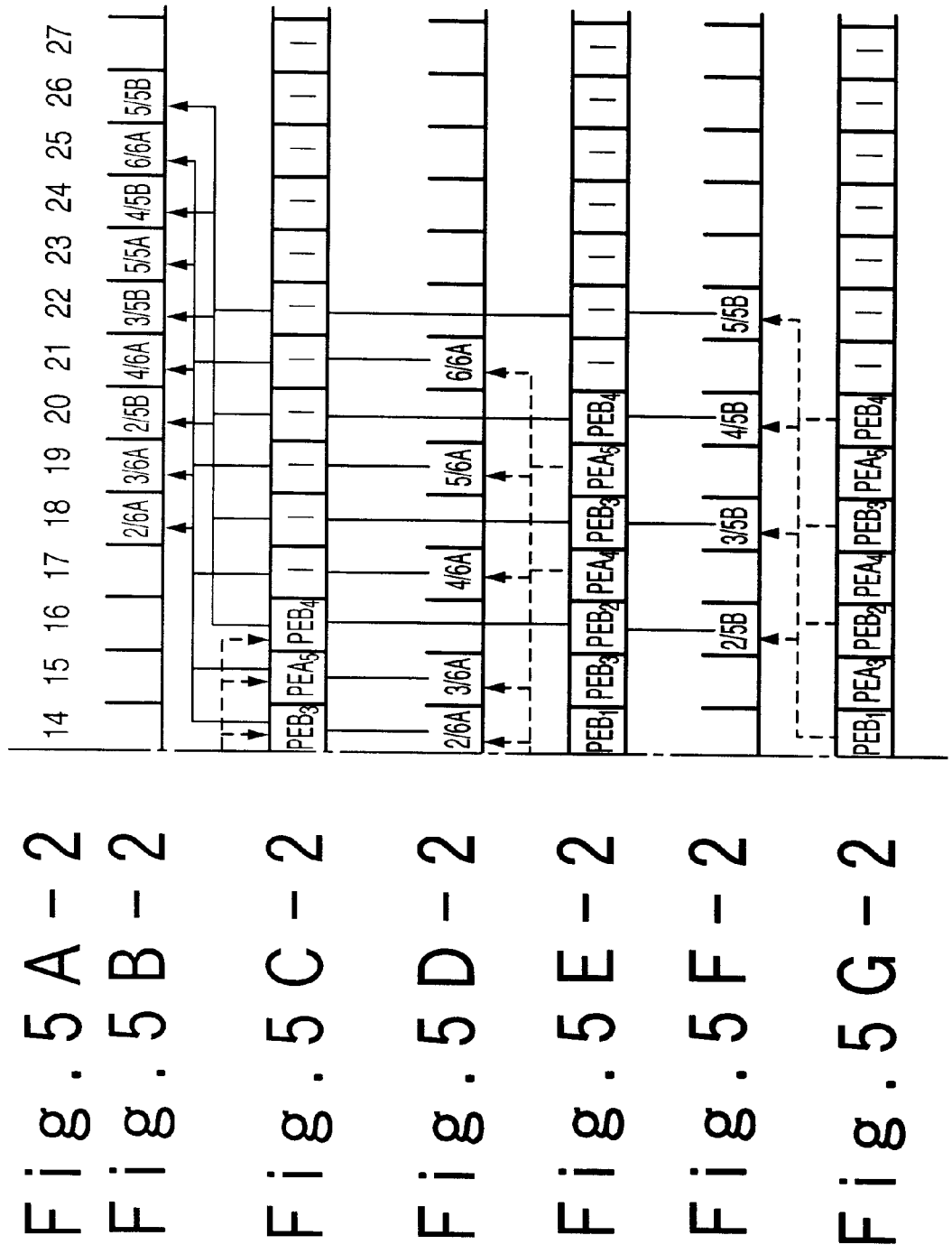

PE SIGNAL TRANSMISSION

SHORT BURST RECEPTION

BUFFER STRUCTURE

TRANSMISSION RESERVATION IN MOBILE SATELLITE COMMUNICATION SYSTEM

BACKGROUND OF THE INVENTION

1. Field of the Invention

The present invention relates to a mobile satellite communication system, and more particularly to a transmission reservation in a mobile satellite communication system which uses a randomly access system and a reserving system.

2. Description of the Related Art

A communication system which utilizes a randomly access control system and a reserving system described below is well known as a communication system in a mobile satellite communication system for performing a communication between a mobile station and a base station apparatus 1 through a satellite.

At first, a mobile station trying to perform a communication transmits a short burst transmission having a long guard bit pattern to a base station apparatus 1 through an upward control channel. Usually, a plurality of mobile stations are assigned to the upward control channel. Thus, there may be a possibility that competition relation for the use of the upward control channel occurs between the respective mobile stations. For the purpose of arbitration the competition relation, a collision control bit pattern is transmitted from the base station apparatus 1 to each mobile station through a downward control channel. The collision control bit pattern includes an I/B (Idle/Busy) flag indicating whether or not the transmission can be performed by use of the upward control channel. Each mobile station always monitors the collision control bit pattern transmitted through this downward control channel. Only when the I/B flag of the collision control bit pattern is set in an "I" state of transmission permission, the short burst transmission is transmitted, and further a clocking operation of a timer is started.

Upon reception of this short burst transmission, the base station apparatus 1 sends a partial echo signal (hereafter, to be referred to as a PE signal) back to the mobile station. The transmission of the short burst transmission from the mobile station to the base station apparatus 1 is ended in this way. If the transmission data from the mobile station to the base station apparatus 1 can be accommodated in the short burst transmission, the transmission from the mobile station to the base station apparatus 1 is ended at this time.

When the I/B flag of the collision control bit pattern is set to the "I" state of transmission permission, the short burst transmission may be often transmitted by a plurality of mobile stations at the same time. In this case, the receiving operation is performed in the base station apparatus 1, in a condition that the short burst transmissions from the plurality of mobile stations collide with each other. As a result, an error is detected in a CRC check operation to the received short burst transmissions. For this reason, the base station apparatus 1 treats the short burst transmissions from the respective mobile stations as non-reception.

On the other hand, the mobile station carries out the clocking operation of the timer and after the short burst transmission. The mobile station determines that the short burst transmission fails, when the timer is set to the state of time-out without any reception of the PE signal from the base station apparatus 1 after the short burst transmission. Then, the mobile station again tries the short burst transmission.

The above-mentioned description gives the communication between the mobile station and the base station apparatus 1 when the data transmitted by the mobile station can be accommodated in the single short burst transmission.

On the contrary, there may be a case in which the transmission data from the mobile station to the base station apparatus 1 is long so that the transmission data cannot be accommodated in the single short burst transmission. In this case, the base station apparatus 1 makes a reservation for use of the upward control channel by the mobile station having transmitted the short burst transmission for transmission of subsequent data. Then, the base station apparatus 1 transmits a collision control bit pattern including the PE signal indicative of the specification data identifying the above mobile station to the mobile station through the downward control channel. Upon reception of this PE signal, the mobile station transmits a long burst transmission including the subsequent data through the upward control channel.

The above-mentioned description gives the communication from the mobile station to the base station apparatus 1 by use of the reserving system.

FIGS. 1A-1 and 1A-2, to 1G-1 to 1G-2 are time charts showing an actual example of a procedure of reserving the upward control channel in the mobile satellite communication system as mentioned above. In this mobile satellite communication system, the communication between the base station apparatus 1 and the mobile station is performed in accordance with a time divisional process. Each mobile station can carry out the transmission to the base station apparatus 1 through the upward control channel, by use of units obtained by dividing a time axis into predetermined time lengths. Moreover, the base station apparatus 1 can use each unit to thereby carry out the transmission through the downward control channel to each mobile station.

In the example shown in FIGS. 1A-1 and 1A-2, to 1G-1 to 1G-2, reservations of the upward control channel are made between the base station apparatus 1 and mobile stations A and B. In this example, it is supposed that a transmission delay between each mobile station and the base station apparatus 1 is four frames (one frame is a time length corresponding to one unit).

In FIGS. 1A-1 and 1A-2, to 1G-1 to 1G-2, when receiving the collision control bit pattern through the downward control channel at a unit No. 0, the mobile station A requesting the transmission to the base station apparatus 1 determines whether or not an I/B flag of this collision control bit pattern indicates "I" or "B". In this example, the I/B flag is set to the "I" state of transmission permission. Accordingly, the mobile station A transmits a short burst transmission 1/6A at a unit NO. 2. After this short burst transmission, the mobile station A starts a clocking operation of a radio channel connection failure timer.

The base station apparatus 1 receives this short burst transmission 1/6A from the mobile station A at a unit NO. 6 delayed from the unit NO. 2 by the four frames. The base station apparatus 1 detects existence of long burst transmissions following the short burst transmission from the data of this received short burst transmission 1/6A. At this time, the base station apparatus 1 transmits PE signals $PEA_1$ to $PEA_5$ in which the number thereof corresponds to this subsequent long burst transmissions. Further, the base station apparatus 1 carries out transmission reservation management of the long burst transmissions from the mobile station A.

On the other hand, the mobile station A carries out the clocking operation of the radio channel connection failure timer, after the short burst transmission, as mentioned above.

If the mobile station A does not receive any PE signal designating the mobile station A until the time-out of this radio channel connection failure timer, the mobile station A recognizes it as "radio channel connection failure". Then, the mobile station A voluntarily ends a reception waiting process of the PE signal, and then carries out a retransmission process of again transmitting the short burst transmission.

However, in this example, the PE signals $PEA_1$ to $PEA_5$ are transmitted from the base station apparatus 1 to the mobile station A through the downward control channel. The first PE signal $PEA_1$, is received by the mobile station A at a unit NO. 12 prior to the time-out of the timer. Accordingly, the mobile station A stops the radio channel connection failure timer, and then transmits a long burst transmission 2/6A at a unit NO. 14.

In this example, since continuously receiving the PE signals $PEA_1$, to $PEA_5$, designating the mobile station A, the mobile station A transmits long burst transmissions 3/6A to 6/6a following the long burst transmission 2/6A.

On the other hand, the base station apparatus 1 waits for a long burst transmission from the mobile station A at specified units having unit NOs. 18 to 22, based on the reservation management of the upward control channel.

The transmission delay between the base station apparatus 1 and the mobile station is large in this system. For this reason, after the mobile station transmits the short burst transmission, it takes a long time for the base station apparatus 1 to carry out the transmission reservation of the long burst transmission in accordance with the PE signal. Meanwhile, the I/B flag of the collision control bit pattern continues to be transmitted from the base station apparatus 1 in the "I" state. Therefore, in the example shown in FIGS. 1A-1 and 1A-2, to 1G-1 to 1G-2, the other mobile station B transmits a short burst transmission 1/5B within the period from the reception of the short burst transmission by the base station apparatus 1 to completion of the transmission reservation of the long burst transmissions. In this case, after receiving the short burst transmission 1/5B from the mobile station B, the base station apparatus 1 carries out the generation of a PE signal and the transmission reservation, similarly to the case of the mobile station A. Then, after transmitting the PE signals designating the mobile station A for the five units, the base station apparatus 1 transmits PE signals designating the mobile station B. In this case, the base station apparatus 1 determines the units, at which the PE signals are transmitted, in such a way that the long burst transmissions from the mobile station B are received after the reception of the long burst transmissions from the mobile station A.

By the way, the above-mentioned conventional mobile satellite communication system has problems described below. That is, there is a case where the number of mobile stations to be managed by the base station apparatus 1 increases, or the number of long burst transmissions transmitted form the mobile stations is large. In this case, the base station apparatus 1 receives the short burst transmissions from the plurality of mobile stations successively for a short time. For this reason, the transmission of the PE signal from the base station apparatus 1 to a mobile station later transmitting a short burst transmission is delayed. Accordingly, the mobile station recognizes the situation as radio channel connection failure and then proceeds to the retransmission process. As a result, the traffic on the upward control channel is increased more and more.

If the mobile station transmitting the short burst transmission to the base station apparatus 1 proceeds to the retransmission process because of the above reason, a transmission disable frame is generated in which all the mobile stations can not use the upward control channel. As a result, the transmission ability of the upward control channel is reduced.

This problem will be specifically described below with reference to FIGS. 1A-1 and 1A-2, to 1G-1 to 1G-2. As shown in FIGS. 1A-1 and 1A-2, to 1G-1 to 1G-2, it is supposed that the base station apparatus 1 receives the short burst transmission 1/6A from the mobile station A at a unit NO. 6 and then receives the short burst transmission 1/5B from the mobile station B at a unit NO. 7. The generation of the PE signal and the transmission reservation by the base station apparatus 1 are carried out in the order of reception of the short burst transmissions. Therefore, in the example shown in FIGS. 1A-1 and 1A-2, to 1G-1 to 1G-2, the transmission of the PE signal to the mobile station B is carried out after the completion of the transmission of the PE signal to the mobile station A.

In this case, if the setting time of the radio channel connection failure timer of the mobile station B is 10 frames, the radio channel connection failure timer of the mobile station B is set to the time-out state before a unit NO. 17 at which the PE signal from the base station apparatus 1 arrives. Thus, the mobile station B has already ended the reception waiting process of the PE signal. However, when receiving the short burst transmission from the mobile station B, the base station apparatus 1 can not predict that the mobile station B proceeds to the retransmission process, as mentioned above. Therefore, the base station apparatus 1 already carries out the transmission reservation for the long burst transmission from the mobile station B, and already transmits the PE signals $PEB_1$ to $PEB_4$ to the mobile station B.

If the transmission reservation for the mobile station B is carried out and then the PE signals $PEB_1$ to $PEB_4$ are transmitted as mentioned above, another mobile stations having transmission requests and the mobile station B itself, which is in the state of waiting for the transmission of the short burst transmission because of the retransmission process, are not allowed to carry out the transmission. Therefore, this results in the generation of a transmission disable frame 32.

In addition to the above conventional example, a reservation system is described in Japanese Examined Patent Application (JP-B-Showa 59-28301). In this reference, a line is divided into time slots and a plurality of stations uses the line in common in a time divisional multiplexing manner. One station adds the highest priority indication to a reservation burst to indicate that the station has the highest priority of slot allocation, and sends it. When receiving it, each of the other stations calculates its station priority in accordance with a predetermined rule to perform slot allocation for its station independently. Thus, the highest priority indication is notified to the other station in accordance with a predetermined rule.

Also, a multi-connection communication system is described in Japanese Laid Open Patent Application (JP-A-Heisei 1-168126). In this reference, communication between a plurality of child stations is controlled by a parent station through a satellite line. Each of the child stations is composed of a buffer, an information adding section, a transmitting section, and a receiving section. The buffer stores packet data to be transmitted. The information adding section reads out the packet data from the buffer after a time elapses, and adds information to the packet data. The transmitting section transmits the packet data with the information added. The receiving section receives data from the parent station and the other child stations. The parent station is composed of a receiving station, a collision detecting section, a slot managing section, and a transmitting section. The receiving section the packet data transmitted from the child station. The collision detecting section detects collision of the packet data. The slot managing section reads out the information from the buffer to make reservation of the packet data. The transmitting section transmits the information of the reservation and the detecting result of the collision detection section to the child station.

Also, a satellite communication system is described in Japanese Laid Open Patent Application (JP-A-Heisei 2-298127). In this reference, a plurality of ground stations commonly uses a radio frequency through a communication satellite in response to connection request signals from terminals. The plurality of ground stations are allocated in advance with individual station numbers, respectively. A transmission and reception unit of each ground station is composed of an adding section, a control section, a detecting section, and a determining section. The adding section adds the station number to a transmission signal. The control section control starts and stop of transmission in response to a connection request signal inputted from the terminal. The detecting section detects the station number contained in a reception signal which is transmitted from the ground station and returned to the ground station by the communication satellite. The determining section determines whether its station number is correctly detected from the reception signal before a predetermined protection time is elapses after the transmission is started in response to the connection request signal. When its station number is not correctly detected from the reception signal, an alarm signal is outputted to the terminal to indicate abnormality of a transmission line while the connection request signal is inputted from the terminal.

Also, a satellite communication system is described in Japanese Examined Patent Application (JP-B-Heisei 3-62329). In this reference, a plurality of peripheral stations access a center station through a satellite and a common channel. Each of the plurality of peripheral stations determines whether a transmission data of its station is a shorter or longer than a predetermined number of slots. Also the peripheral station makes reservation for transmission time slots to transmit the long data, and transmits the short data using a time slot which is not reserved. The center station is composed of a traffic detecting section. The traffic detecting section detects a total traffic amount from the plurality of peripheral stations and outputs an instruction to the peripheral stations to shorten a time slots length when the detected total traffic amount is larger than a predetermined value. Each peripheral station is composed of a slot length setting section for changing and setting the time slot length in accordance with the instruction.

Also, a radio reservation system is described in Japanese Laid Open Patent Application (JP-A-Heisei 4-256231). In this reference, an information control section 32 of a mobile station 21 makes reservation registration of a line to a reservation information storing section 35 when the communication channels are all in a traffic jam state. The information control section 32 automatically originates a call when an empty portion is detected in the line. Further, the information control section 32 stores a new identifier in an area identifier storing section 36 when a station area is changed. An automatic call originating operation is performed to a new station. The information control section 32 makes reservation registration of a line to a reservation information storing section 35 when the communication channels are all in a traffic jam state, and automatically originates a call when an empty portion is detected in the line.

SUMMARY OF THE INVENTION

The present invention is accomplished to solve the above-mentioned problems. Therefore, an object of the present invention is to provide a method and system for making transmission reservation in a mobile satellite communication system which can prevent a mobile station from uselessly proceeding to retransmission process of a short burst transmission even if a traffic is increased.

In order to achieve an aspect of the present invention, a mobile satellite communication system includes a plurality of mobile stations, and a base station apparatus connected to the plurality of mobile stations through a communication satellite. The base station apparatus performs transmission to the plurality of mobile stations using a single downward control channel and reception from the plurality of mobile stations using a single upward control channel. Each of the plurality of mobile stations performs a short burst transmission requesting long burst transmissions. The base station apparatus includes a partial echo (PE) signal buffer for storing an identifier of each of mobile stations requesting long burst transmissions, the identifier being contained in a PE signal, a PE signal transmission counter for storing a number of long burst transmissions as a transmission count for each of the requesting mobile stations, and a transmission reservation count storing buffer for storing a number of the requesting mobile stations as a transmission reservation count, the transmission reservation count being updated in response to the requesting short burst transmission. A control unit transmits a collision control signal including the PE signal based on a maximum allowable transmission reservation count and the transmission reservation count in response to the requesting short burst transmission.

The mobile satellite communication system may further include a maximum allowable transmission reservation count buffer for storing the maximum allowable transmission reservation count. In this case, the control unit reads out the maximum allowable transmission reservation count from the maximum allowable transmission reservation count buffer and performs the transmission of collision control signal, based on the read maximum allowable transmission reservation count and the transmission reservation count.

When the collision control signal is transmitted to one of the requesting mobile stations, the control unit decrements the transmission count for the one requesting mobile station by "1". Also, the control unit decrements the transmission reservation count by "1" when the collision control signal is repeatedly transmitted to one of the requesting mobile stations for the transmission count.

The control unit transmits the collision control signal including the PE signal to one of the requesting mobile stations determined based on the maximum allowable transmission reservation count and the transmission reservation count in response to the requesting short burst transmission.

In this case, when the transmission reservation count is smaller than the maximum allowable transmission reservation count, the control unit transmits the collision control signal including the PE signal to one of the requesting mobile stations continuously for the transmission count. Also, when the transmission reservation count is equal to or larger than the maximum allowable transmission reservation count, the control unit circularly transmits the collision control signals to the requesting mobile stations one by one for every transmission time unit.

Each of the plurality of mobile stations may include a timer which is set to a time-out state in a predetermined number of transmission time units. In this case, an allowable number of the requesting mobile stations is determined based on a communication delay time between the base station apparatus and each of the plurality of mobile stations and the predetermined number of transmission time units of the timer.

In order to achieve another aspect of the present invention, a method of transmitting a data from each of a plurality of mobile stations to a base station apparatus through a communication satellite in a mobile satellite communication system, wherein transmission from the base station apparatus to the plurality of mobile stations is performed using a single downward control channel and transmission from the plurality of mobile stations to the base station apparatus is performed using a single upward control channel, comprising the steps of:

performs a short burst transmission requesting long burst transmissions from each of requesting ones of the plurality of mobile stations to the base station apparatus;

updating a transmission reservation count in response to the requesting short burst transmission;

transmitting a collision control signal including a partial echo (PE) signal from the base station apparatus to the requesting mobile stations for numbers of long burst transmissions as transmission counts based on a maximum allowable transmission reservation count and the transmission reservation count in response to the requesting short burst transmission, the PE signal including an identifier of each of the requesting mobile stations; and transmitting the data from each of the requesting mobile stations to the base station apparatus.

BRIEF DESCRIPTION OF THE DRAWINGS

FIGS. 1A-1 and 1A-2, to 1G-1 and 1G-2 are time charts illustrating a method for reserving an upward control channel in a conventional mobile communication system;

FIG. 2 is a block diagram illustrating the structure of a mobile communication system according to a first embodiment of the present invention;

FIGS. 5A-1 and 5A-2 to 5G-1 and 5G-2 are time charts illustrating a method for reserving an upward control channel in the first embodiment;

DESCRIPTION OF THE PREFERRED EMBODIMENTS

A mobile satellite communication system of the present invention will be described below with reference to the attached drawings.

Figure 2:
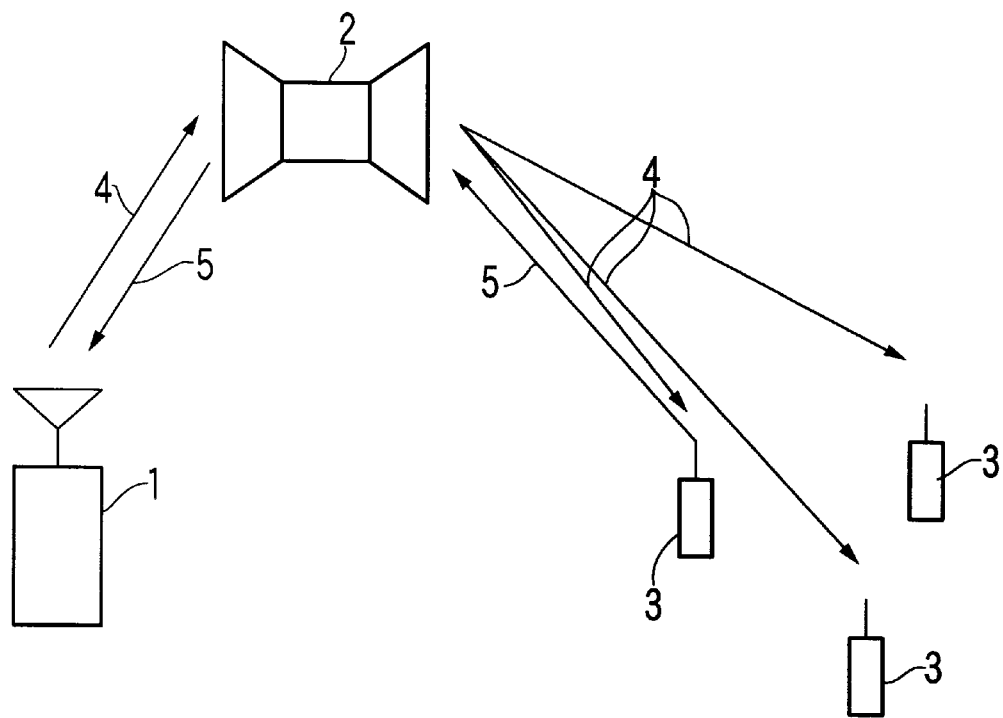

FIG. 2 is a block diagram illustrating the structure of a mobile satellite communication system according to an embodiment of the present invention. This mobile satellite communication system is composed of a base station apparatus 1, a satellite 2 and a plurality of mobile stations 3. A data outputted from the base station apparatus 1 is transmitted to the plurality of mobile stations 3 through the satellite 2 by use of a downward control channel 4. On the other hand, a data outputted from the respective mobile stations are transmitted to the base station apparatus 1 through the satellite 2 by use of an upward control channel 5.

The transmissions from the base station apparatus 1 to the respective mobile stations 3 by use of the downward control channel 4 are carried out in succession in transmission units. Each mobile station 3 receives all the data transmitted through the downward control channel 4. The upward control channel 5 is used only when there is a need of the transmission from the mobile station 3 to the base station apparatus 1. Thus, the transmission by use of the upward control channel 5 is not always carried out. Therefore, the reception from the upward control channel 5 in the base station apparatus 1 is a burst reception. The upward control channel 5 is shared by the plurality of mobile stations 3. Thus, each mobile station 3 determines whether or not the upward control channel 5 can be used, in accordance with an I/B flag of a collision control bit signal transmitted through the downward control channel 4.

Figure 3:
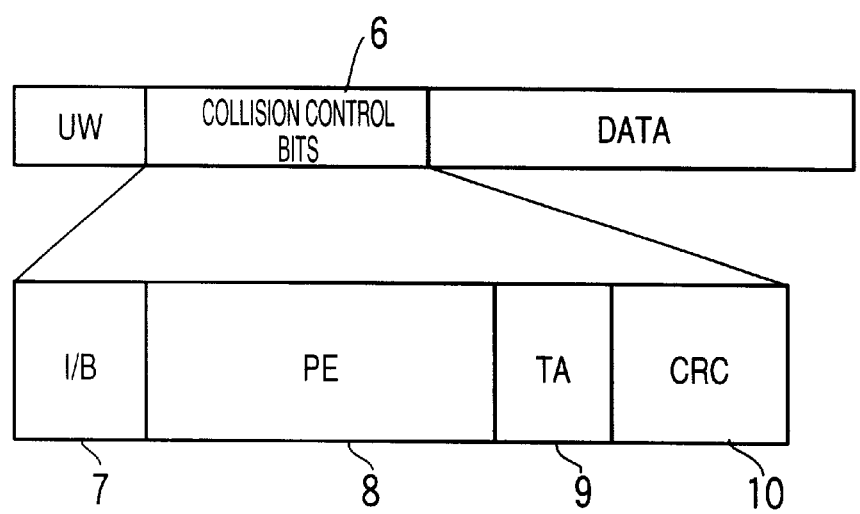
FIG. 3 is a diagram illustrating the structure of a collision control bit pattern on a downward control channel in the first embodiment.

FIG. 3 shows the structure of a collision control signal, including a collision control bit pattern 6, transmitted through the downward control channel 4. This collision control bit pattern 6 is composed of an I/B flag 7, a PE signal 8, a TA (Time Alignment Control Value) 9 and a CRC code 10. The I/B flag 7 is a data indicative of the use permission/inhibition of the upward control channel 5. The PE signal 8 indicates an identification data specifying one of the mobile stations 3 for which the upward control channel 5 is reserved in accordance with the I/B flag 7. The base station apparatus 1 carries out a transmission reservation for long burst transmissions from the mobile station 3. If executing the transmission reservation for a certain mobile station 3, the base station apparatus 1 transmits the PE signal 8 indicative of the identification data of the mobile station 3. If the I/B flag 7 of the collision control bit pattern 6 is set to a "B" (Busy) state, only a particular mobile station 3 having the identification data can carry out the long burst transmission through the upward control channel 5 in a transmission unit.

Figure 4:
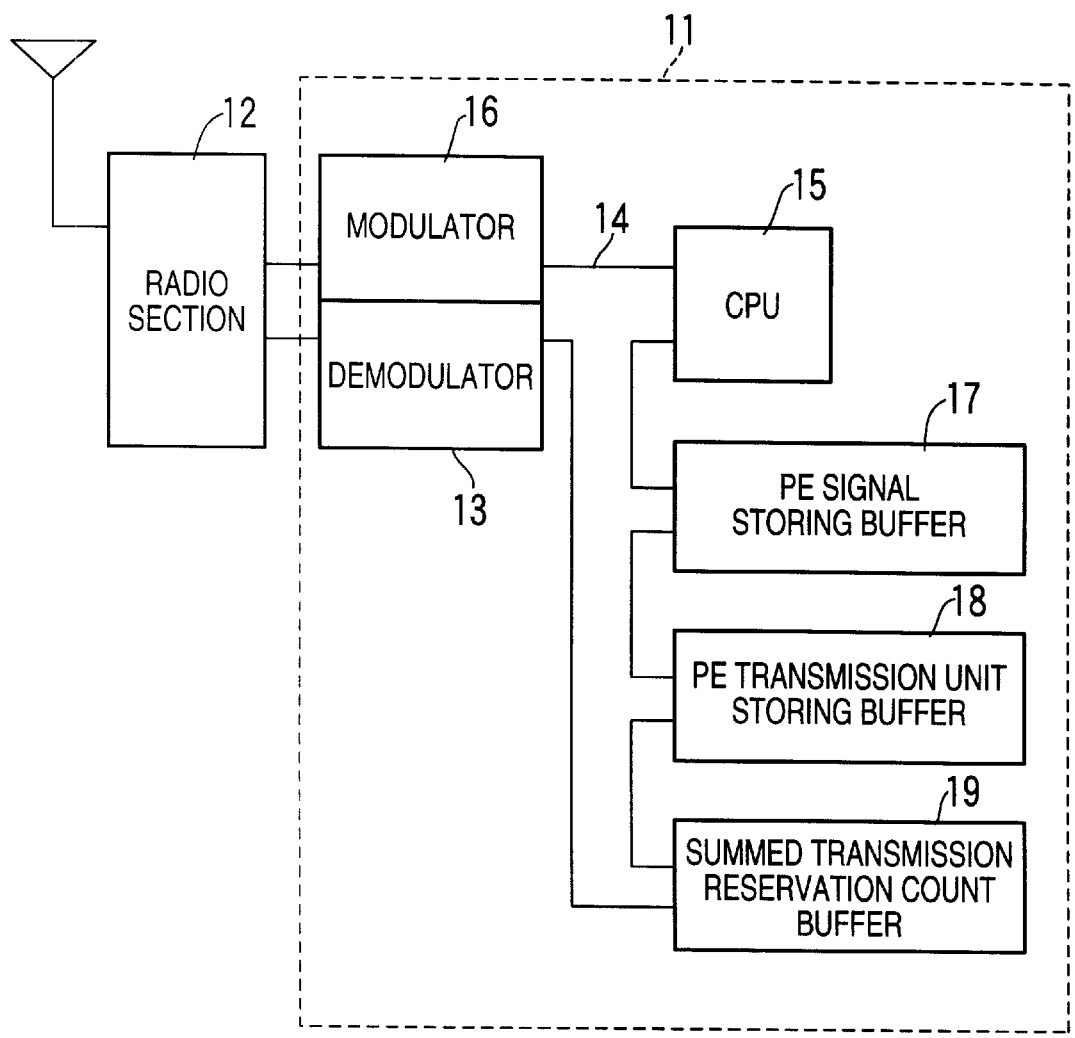
FIG. 4 is a block diagram illustrating the structure of a base station apparatus 1 in the first embodiment.

FIG. 4 is a block diagram illustrating the structure of the base station apparatus 1 in this embodiment. As shown in FIG. 4, the base station apparatus 1 is composed of a transmission/reception control section 11 and a radio section 12 serving as a radio interface with the mobile stations 3. The transmission/reception control section 11 is composed of a demodulator 13, a CPU 15, a modulator 16, a PE signal storing buffer 17, a PE transmission unit storing buffer 18, a summed transmission reservation count buffer 19 and a data bus 14 connecting these respective elements.

The radio section 12 receives a radio signal from the mobile station 3 through the upward control channel 5. The demodulator 13 demodulates the signal received by the radio section 12. A data generated through this demodulation is supplied to the CPU 15 (Central Processing Unit) through the data bus 14. The modulator 16 modulates a transmission data to the mobile station 3 outputted from the CPU 15. A signal modulated by this modulator 16 is transmitted from the radio section 12 to the mobile station 3 through the downward control channel 4. The PE signal storing buffer 17, the PE transmission unit storing buffer 18 and the summed transmission reservation count buffer 19 are the storing devices used when the transmission/reception control section 11 performs the process of reserving the upward control channel.

Next, an operation of the mobile satellite communication system in this embodiment will be described below. One feature of this embodiment is the process of reserving the upward control channel carried out by the base station apparatus 1. FIGS. 5A-1 and 5A-2 to 5G-1 and 5G-2 show an example of this process of reserving the upward control channel. At first, in order to easily understand this embodiment, the process of reserving the upward control channel will be described with reference to the example shown in FIGS. 5A-1 and 5A-2 to 5G-1 and 5G-2.

In the example shown in FIGS. 5A-1 and 5A-2 to 5G-1 and 5G-2, a mobile station A transmits a short burst transmission 1/6A to request long burst transmissions. Also, a mobile station B transmits a short burst transmission 1/5B with a delay for one unit from the short burst transmission 1/6A. The data transmission from the mobile station A is composed of 6 transmission units and the data transmission from the mobile station B is composed of 5 transmission units. A transmission delay between each mobile station 3 and the base station apparatus 1 is 4 transmission units. The mobile station 3 sets to 10 transmission units, the time-out value of a radio channel connection failure timer 20 after the short burst transmission. A transmission frame 21 from the base station apparatus 1 is set to be a reference as a timing of a radio frame between the base station apparatus 1 and the mobile station 3. The base station apparatus 1 establishes a reception frame 22 when establishing the transmission frame 21. The mobile station 3 receives the transmission frame 21 from the base station apparatus 1, and then establishes a transmission frame 23 from the mobile station 3 based on the transmission frame 21.

In the example shown in FIGS. 5A-1 and 5A-2 to 5G-1 and 5G-2, the base station apparatus 1 receives the short burst transmission 1/6A from the mobile station A at a unit NO. 6. Then, the base station apparatus 1 transmits a PE signal designated to the mobile station A through the downward control channel 4 at a unit NO. 8, to require the successive transmission of the long burst transmissions. However, the base station apparatus 1 receives the short burst transmission 1/5B from the mobile station B, at a unit NO. 7 next to the unit at which the short burst transmission 1/6A from the mobile station A is received. In this embodiment, a process described below is performed on the short burst transmission 1/5B from this mobile station B.

At first, the base station apparatus 1 determines based on the transmission delay and the number of PE signal transmission reservations, whether or not the PE signal is earlier received by the mobile station B than the radio channel connection failure timer of the mobile station B is set to the time-out state, when the transmission reservation management of the PE signal is executed in the normal process. If it is determined that the radio channel connection failure timer of the mobile station B is set to the time-out state before the PE signal is received by the mobile station B, the base station apparatus 1 starts a process of circularly transmitting the PE signal for each unit to the mobile station B and the mobile station A, after the transmission reservation management of the PE signal for the mobile station A. In this way, each mobile station can receive the PE signal destined to its station before the time-out of the radio channel connection failure timer. Thus, the connection failure never occurs, so that the retransmission process is not required. Therefore, the long burst transmissions can be performed in accordance with the transmission reservation count by the base station apparatus 1.

The above-mentioned description gives the process of reserving the upward control channel in this embodiment.

Figure 6:
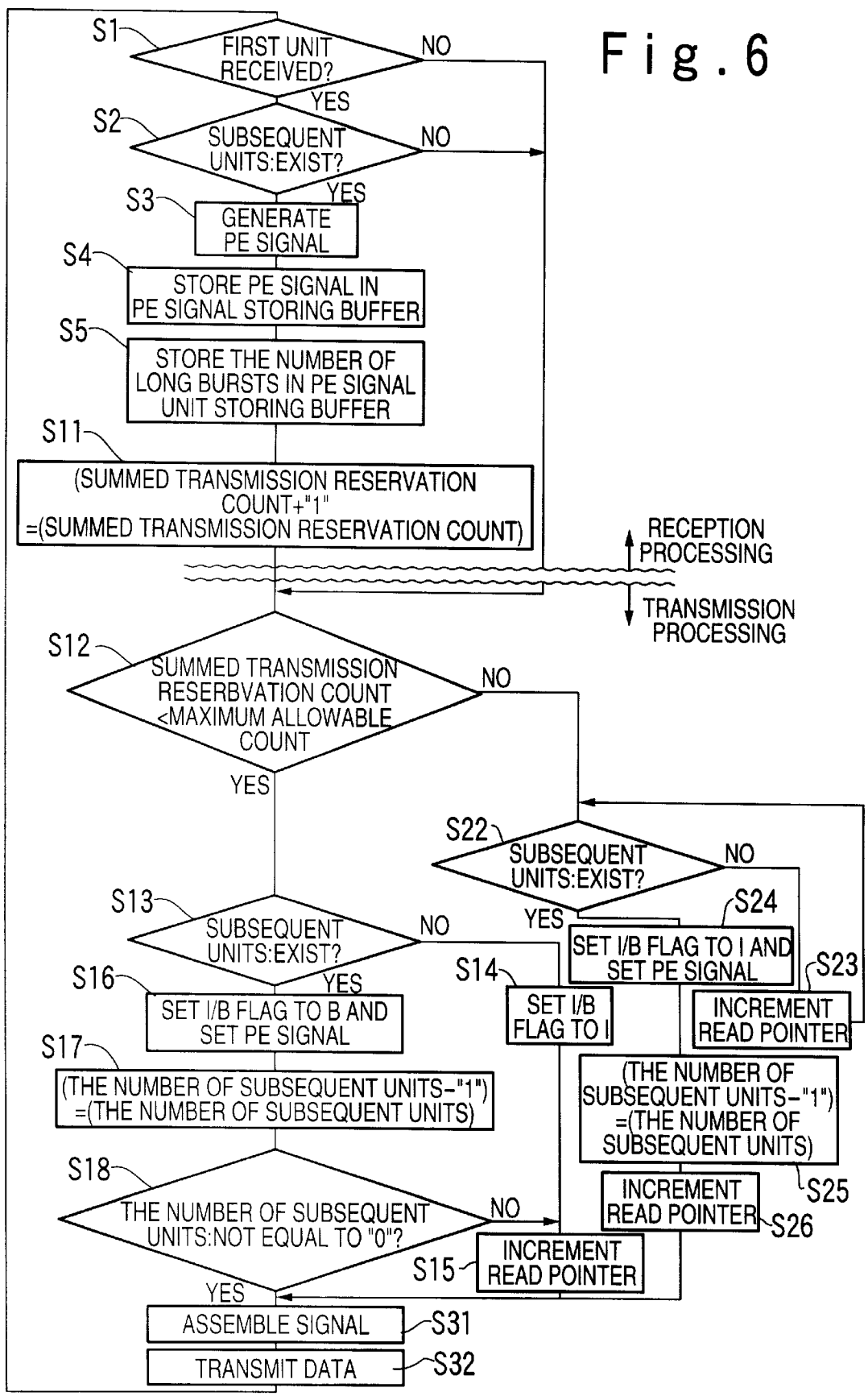
FIG. 6 is a diagram to explain a transmission reservation by use of a double buffer in the first embodiment.

The process of reserving the upward control channel in this embodiment is carried out under the control of the transmission/reception control section 11 in the base station apparatus 1. FIG. 6 is a flowchart to explain the process of reserving the upward control channel carried out by this transmission/reception control section 11. The process of reserving the upward control channel shown in FIG. 6 is composed of a receiving process and a transmitting process. The transmission/reception control section 11 executes these receiving and transmitting processes within one unit period.

Figure 7C:
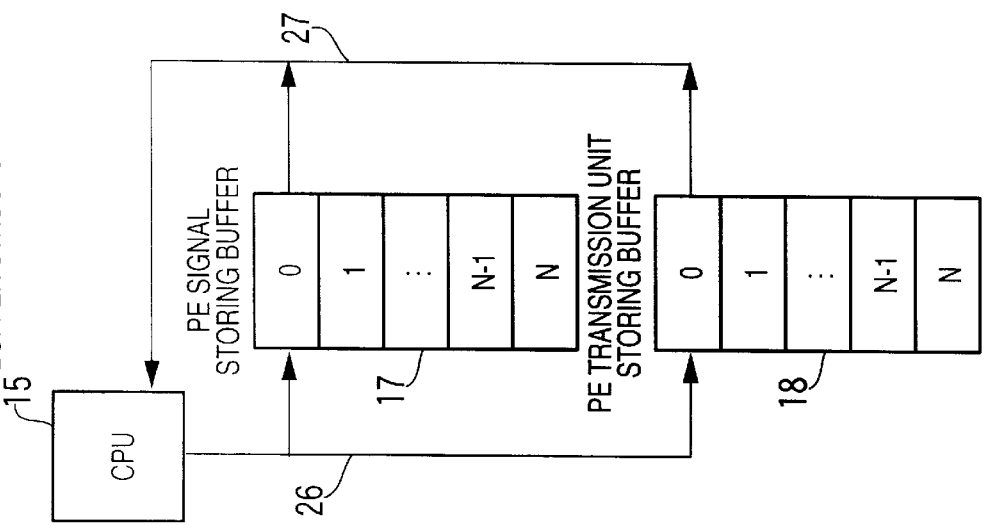
FIGS. 7A to 7C are diagrams illustrating the procedure of reserving the upward control channel in the first embodiment.
Figure 7B:
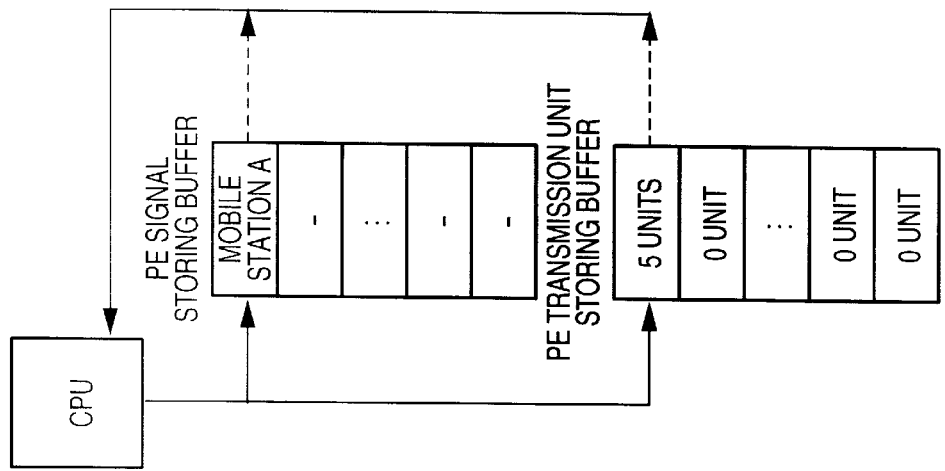
Figure 7A:
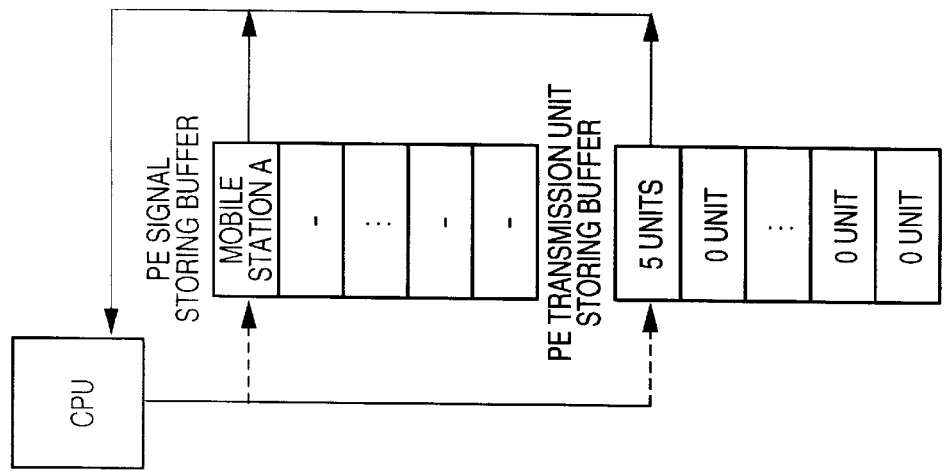

The transmission of the PE signal to the mobile station 3 is carried out in the process of reserving the upward control channel shown in FIG. 6. This transmission management of the PE signal is executed by using as a double buffer the PE signal storing buffer 17 and the PE transmission unit storing buffer 18 shown in FIG. 4. FIGS. 7A, 7B and 7C show a process of managing the transmission of the PE signal by use of this double buffer. In this embodiment, as shown in FIG. 7A, a write address of the buffer in which a data is written by the CPU 15 through the data bus 14 is specified by the write pointer 26. Also, a read address of the buffer from which the data is read out is specified by a read pointer 27. The updates of the respective pointers are synchronously carried out in the PE signal storing buffer 17 and the PE transmission unit storing buffer 18.

The process of reserving the upward control channel in this embodiment will be described below in detailed in accordance with the flowchart shown in FIG. 6, with reference to FIGS. 7A, 7B and 7C, as necessary.

At first, when the CPU 15 in the transmission/reception control section 11 receives a short burst transmission (Step S1), the CPU 15 detects whether or not there is a transmission request of long burst transmissions from the mobile station 3, in accordance with the data of this short burst transmission (Step S2). If there is the transmission request of the long burst transmission, the CPU 15 generates a PE signal which is an identification data of the mobile station 3 (Step S3).

Figures 5A-1, 5B-1, 5C-1, 5D-1, 5E-1, 5F-1, 5G-1:
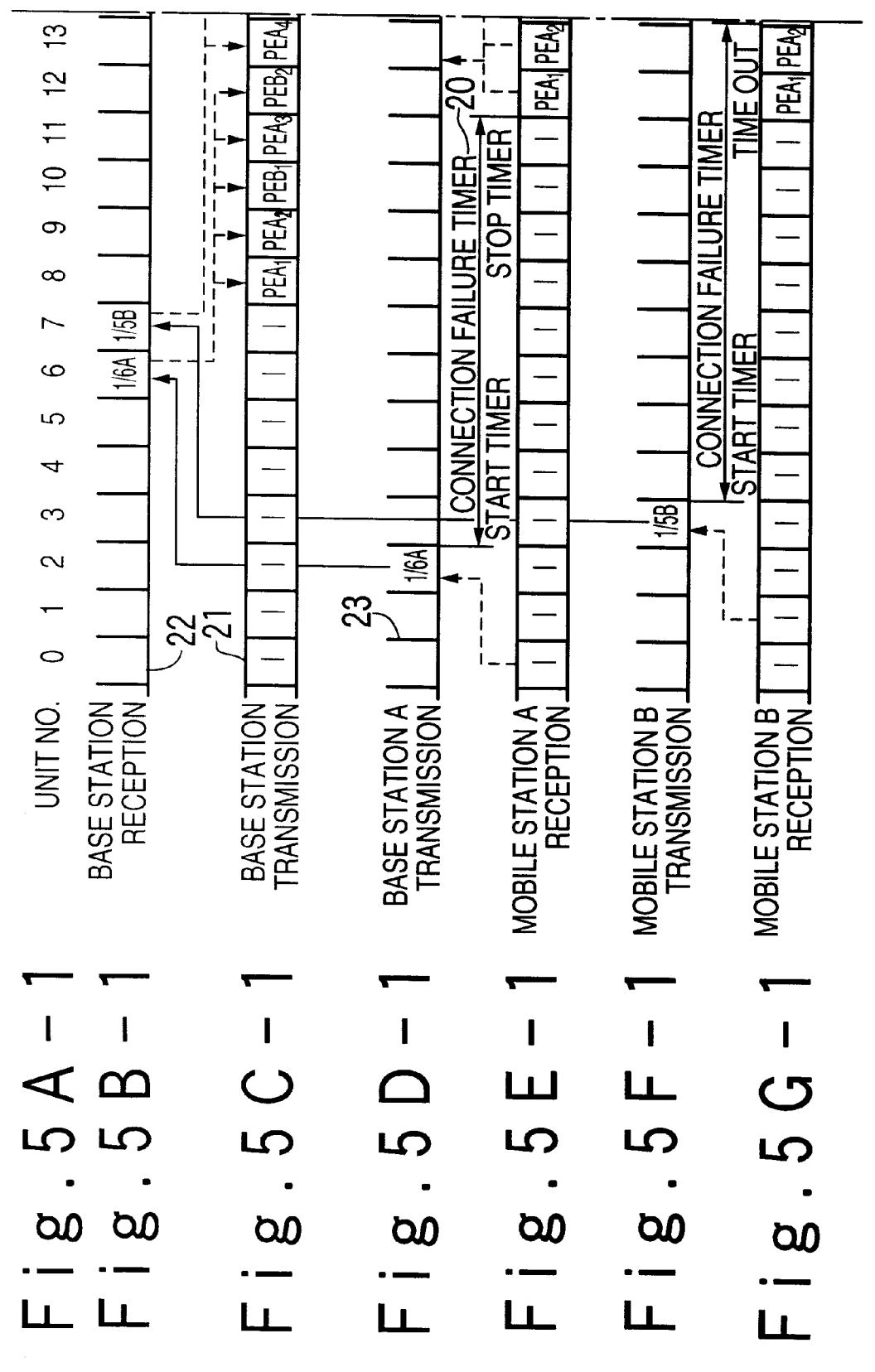

As shown in FIGS. 5E-1 and 5E-2, the mobile station A detects the I/B flag of the downward control channel 4 in accordance with a reception data of unit NO. 0 to recognize a transmission permission to the base station apparatus 1. Then, the mobile station A performs a short burst transmission 1/6A at a unit NO. 2. The short burst transmission 1/6A is received by the base station apparatus 1 at unit NO. 6 after the transmission delay of 4 units. Thus, in the case of the example shown in FIGS. 5A-1 and 5A-2 to 5E-1 and 5E-2, in the receiving process at the unit NO. 6, the CPU 15 detects from the reception data, a fact that the short burst transmission 1/6A is a first unit, and five subsequent units are related to this first unit. Then, the CPU 15 generates a PE signal to be transmitted to the mobile station A.

Next, the CPU 15 stores this generated PE signal in the PE signal storing buffer 17 for the transmission to the mobile station A (Step S4). In this case, the base station apparatus 1 needs to transmit the PE signal 8 to the mobile station A for the number of long burst transmissions to which the permission of transmission is given. For this purpose, the CPU 15 stores the number of long burst transmissions, that is, the number of subsequent units in the PE transmission unit storing buffer 18 (Step S5). Write addresses of the PE signal storing buffer 17 and PE transmission unit storing buffer 18 are commonly given by the write pointer 26 at the times of the executions of the steps S4 and S5.

FIG. 7B shows the method of writing the number of long burst transmissions and the PE signal. As mentioned above, in the case of the example shown in FIGS. 5A-1 and 5A-2, the short burst transmission 1/6A from the mobile station A is received in the receiving process at the unit No. 6 (Step S1). Also, the facts that this short burst transmission 1/6A is the first unit, and that the five subsequent units are related to this first unit are detected at the above-mentioned step S2. Therefore, at the subsequent step S4, as shown in FIG. 7B, the identification data indicative of the mobile station A is written as the PE signal in the address of the PE signal storing buffer 17 specified by the write pointer 26. At the step S5, the number of subsequent units (5 units which is equivalent to the number of long burst transmissions) is written in the address of the PE transmission unit storing buffer 18 specified by the write pointer 26.

After completion of the writing operations of the number of long burst transmissions and the PE signal, the write pointer 26 is updated as shown in FIG. 7C. Accordingly, after that, when a short burst transmission requesting long burst transmissions is received from another mobile station B, the similar data writing operations are performed to next addresses of the PE signal storing buffer 17 and PE transmission unit storing buffer 18.

The above-mentioned description details the receiving process.

Next, the transmitting process will be described below. It should be noted that the illustration of the processes having no relation to the features of this embodiment is omitted in FIG. 6. Thus, the explanation of these processes is omitted.

After the completion of the above-mentioned receiving process, the operational flow proceeds to a step S11 of the transmitting process. At the step S11, a summed transmission reservation count stored in the summed transmission reservation count buffer 19 is counted up by "1" in response to the short burst transmission requesting the long burst transmissions. As a result, the value of the summed transmission reservation count is "1". The value is stored in the summed transmission reservation count buffer 19. Then, the flow proceeds to a step S12.

At this step S12, it is determined whether or not the number of transmission reservations, is smaller than the maximum allowable transmission reservation count. That is, at this step S12, the CPU 15 determines whether or not the summed transmission reservation count stored in the buffer 19 is smaller than the maximum allowable reservation count which is a predetermined upper limit value. The maximum allowable reservation count used here implies the number of transmission units obtained by subtracting the number of transmission units corresponding to the transmission delay times in the upward and downward control channels (4 units×2=8 units) from the time-out value (10 units) of the radio channel connection failure timer of the mobile station 3. Thus, the maximum allowable reservation count is determined as two units in this example.

That is, at this step S12, on the basis of the summed transmission reservation count as the number of radio channel connection requests from the mobile station (this value is generally equal to the number of mobile stations requesting long burst transmissions) and the maximum allowable reservation count number, it is determined whether or not the mobile station can receive a partial echo (PE) signal destined to its mobile station through the downward control channel, until the radio channel connection failure timer started by the mobile station itself is set to the time-out state after the short burst transmission. In this way, the maximum allowable reservation count may be determined based on the time-out value and the transmission delay times such that the mobile station can receive the PE signal without the time-out of the radio channel connection failure timer.

In the example shown in FIGS. 5A-1 and 5A-2, there is no reception of the short burst transmission prior to the reception of the short burst transmission 1/6A at the unit NO. 6. Therefore, the summed transmission reservation count at the unit NO. 6 is set to "1", described above. When the summed transmission reservation count, "1" in this case is smaller than the maximum allowable reservation count of "2", the time-out of the radio channel connection failure timer does not occur in the mobile station, even if the normal transmission reservation management is executed. Thus, the operational flow proceeds from the step S12 to a step S13.

Next, the CPU 15 executes a subsequent unit checking process (Step S13). In this subsequent unit checking process, it is determined whether or not there is a subsequent unit, namely, whether or not the number of subsequent units stored in the address of the PE transmission unit storing buffer 18 designated by the read pointer 27 is larger than 0. In the example shown in FIG. 7C, since a data of "5 units" is stored in the address, the CPU 15 recognizes a fact that there are subsequent units.

If there is any subsequent unit, the CPU 15 sets the I/B flag to a "B" state of transmission inhibition, and then set the I/B flag in the collision control bit pattern. Also, the CPU 15 reads out the PE signal from the address of the PE signal storing buffer 17 specified by the read pointer 27, and then sets it in the collision control bit pattern (Step S16). In the case of the example shown in FIG. 7C, the PE signal corresponding to the mobile station A is stored in the address of the PE signal storing buffer 17 specified by the read pointer 27. Therefore, in the case of this example, the I/B flag indicative of the B state of transmission inhibition and the PE signal $PAE_1$, corresponding to the mobile station A are set in the collision control bit pattern.

Next, at a step S17, the number of subsequent units stored in the address of the PE transmission unit storing buffer 18 specified by the read pointer 27 is decremented by "1". In the example shown in FIG. 7C, the number of subsequent units is decreased from 5 units to 4 units.

Next, at a step S18, it is determined whether or not the number of subsequent units is "0". If the number of subsequent units is not "0", the already-generated collision control bit pattern is used so that a collision control signal including the collision control bit pattern and destined to the mobile station 3 is assembled (Step S31). Then, the data transmitting process for transmitting the collision control signal through the downward control channel 4 to each mobile station 3 is performed (Step S32). As a result, the collision control bit pattern including the I/B flag indicative of the "B" state of transmission inhibition and the PE signal $PEA_1$, corresponding to the mobile station A is transmitted through the downward control channel 4 at a unit NO. 8 after two frames.

If the subsequent unit is "0" at the step S13, the operational flow proceeds from the step S13 to the step S14. In this case, the I/B flag indicative of the "I" state of transmission permission is set in the collision control bit pattern (Step S14). Subsequently, the read pointer 27 is incremented by "1" (Step S15). The collision control bit pattern in which the I/B flag has been set is used so that a signal destined to the mobile station 3 is assembled (Step S31). This assembled signal is transmitted to the respective mobile stations 3 through the downward control channel 4. Thereafter, the transmitting process is ended, and the flow returns to the step S1.

After that, the operation proceeds to a next unit, and the receiving process is again executed.

In the example shown in FIGS. 5A-1 and 5A-2, the base station apparatus 1 receives the short burst transmission 1/5B from the mobile station B, at a unit NO. 7. In the case of this example, in the receiving process at the unit NO. 7, the PE signal and the number of subsequent units are written in a collision control bit pattern, as in the mobile station A (Steps 4 and 5). However, as shown in FIG. 7C, the write pointer 26 of the PE signal storing buffer 17 and the PE transmission unit storing buffer 18 are updated in the receiving process of the short burst transmission 1/6A from the mobile station A. For this reason, the PE signal corresponding to the mobile station B is written to an address next to the address at which the PE signal corresponding to the mobile station A is stored in the PE signal storing buffer 17. Also, the number of subsequent units to be transmitted by the mobile station B is written to an address next to the address at which the number of subsequent units for the mobile station A is stored in the PE transmission unit storing buffer 18. Subsequently, at the unit NO. 7, the summed transmission reservation count is updated based on the short burst transmission at the step S11 such that the summed transmission reservation count is incremented from "1" to "2".

Next, the transmitting process at the unit NO. 7 will be described. At the step S12, it is determined whether is smaller than the maximum allowable transmission reservation count. Since the maximum allowable transmission reservation count is "2", the value is not smaller than the maximum allowable transmission reservation count. Thus, in the transmitting process, the operational flow proceeds from the step 12 to a step S22.

At the step S22, the subsequent unit checking process is executed as in the step S22. At the unit NO. 7, the addresses in which the PE signal and the number of subsequent units for the mobile station A are stored are specified by the read pointer 27. The number of subsequent units for the mobile station A is "4". Thus, in the subsequent unit checking process at the step S22, it is determined that there are the subsequent units. Therefore, the operational flow proceeds from the step S22 to a step S24. At the step S24, the I/B flag indicative of the "B" state is set in the collision control bit pattern, and the PE signal corresponding to the mobile station A is set therein.

Next, at a step S25, the number of subsequent units stored in the address of the PE transmission unit signal storing buffer 18 specified by the read pointer 27 is decremented by "1" to be "3".

After that, the read pointer 27 are incremented (Step S26) to specify the addresses in which the PE signal corresponding to the mobile station B and the number of subsequent units to be transmitted from the mobile station B are stored. Then, a signal assembling process is executed using the collision control bit pattern generated at the step S24 (Step S31). The assembled signal is transmitted through the downward control channel 4 at a unit NO. 9. The PE signal PEA$_2$ destined to the mobile station A is transmitted in this way.

There is not the reception of the short burst transmission at a unit NO. 8. Thus, the process of generating the PE signal is not carried out in the receiving process.

In the transmitting process, the summed transmission reservation count is not smaller than the maximum allowable reservation count, similarly to the previous case. Thus, the operational flow proceeds to the step S22. However, the read pointer 27 is incremented at the step S26 of the transmitting process in the previous cycle (the unit NO. 7). Thus, the respective processes at these steps S22 to S25 are performed to the mobile station B.

That is, at the step S22, the subsequent unit checking process is executed. However, at the unit NO. 8, the addresses in which the PE signal and the number of subsequent units for the mobile station B are stored are specified by the read pointer 27. In this case, the number of subsequent units is "4". Therefore, the operational flow proceeds from the step S22 to the step S24. At the step S24, the I/B flag indicative of the "B" state is set in the collision control bit pattern, and the PE signal corresponding to the mobile station B is set therein.

Next, at the step S25, the number of subsequent units which corresponds to the mobile station B and is stored in the address of the PE transmission unit signal storing buffer 18 specified by the read pointer 27 is decremented by "1" to be "3".

After that, the read pointer 27 is incremented (Step S26). Then, the signal assembling process is executed using the collision control bit pattern (Step S31). The assembled signal is transmitted through the downward control channel 4 at a unit NO. 10. The PE signal PEB$_1$ destined to the mobile station B is transmitted in this way.

As mentioned above, even if the summed transmission reservation count is equal to or larger than the maximum allowable reservation count, the transmission of the PE signal to the mobile station B can be executed during the transmission reservation management of the PE signal to the mobile station A.

Next, the process at the unit NO. 9 will be described below. In the transmitting process at this unit, the read pointer 27 has been already incremented in the previously transmitting process. Thus, the number of subsequent units has not been written in the address of the PE transmission unit storing buffer 18 specified by the write pointer 26. For this reason, it is determined that there is no subsequent unit, in the subsequent unit checking process at the step S22. Then, the number of subsequent units which is not "0" in the PE transmission unit storing buffer 18 is retrieved, while the read pointer 27 is circulatively incremented (Steps S22 and S23). Through this process, the read pointer 27 returns back to the addresses of the PE transmission unit storing buffer 18 and the PE signal storing buffer 17 in which the number of subsequent units and the PE signal corresponding to the mobile station A are stored. As a result, following the transmission of the PE signal PEB$_1$ destined to the mobile station B at the unit NO. 10, a PE signal PEA$_3$ destined to the mobile station A is transmitted at a unit NO. 11 (Step S32).

When it is determined at the step S22 that there is no subsequent unit for the mobile station A although the mobile station A is stored in the buffer 17, the operational flow proceeds from the step 23. At the step S23, the summed transmission reservation count is decremented by "1" to be "1". Also, the identification data of the buffer 17 is deleted. Then, the read pointer is incremented "1".

As mentioned above, if the summed transmission reservation count is not smaller than the maximum allowable reservation count, the PE signals are alternately transmitted to the mobile station A and the mobile station B through the downward control channel 4. Therefore, the mobile station B can receive the PE signal $PEB_1$ before the radio channel connection failure timer is set to the time-out state, different from the conventional technique. Thus, it is possible to carry out the transmitting process of the long burst transmission. Also, the base station apparatus 1 waits for the reception of the long burst transmission based on the long burst transmission reservation management in accordance with the PE signal. Therefore, the base station apparatus 1 and mobile station are coincident with each other in recognition of long burst transmission management.

As explained above, according to this embodiment, when the field traffic increases so that the summed transmission reservation count increase, the PE signal is selected and transmitted for each unit, unit by unit. As a result, the PE signal can be received before the time-out of the radio channel connection failure timer of the mobile station. Also, if the filed traffic is reduced, it is possible to return to the normal process.

Also, the summed transmission reservation count is substantially the same as the number of mobile stations requesting long burst transmissions in the above description. However, a total number of transmission units which are all stored in the buffer 18 may be used as the summed transmission reservation count. In this case, the maximum allowable transmission reservation count is determined based on the transmission delay units such that the time-out does not occur in each mobile station.

Next, the mobile satellite communication system according to the second Embodiment of the present invention will be described.

Figure 8:
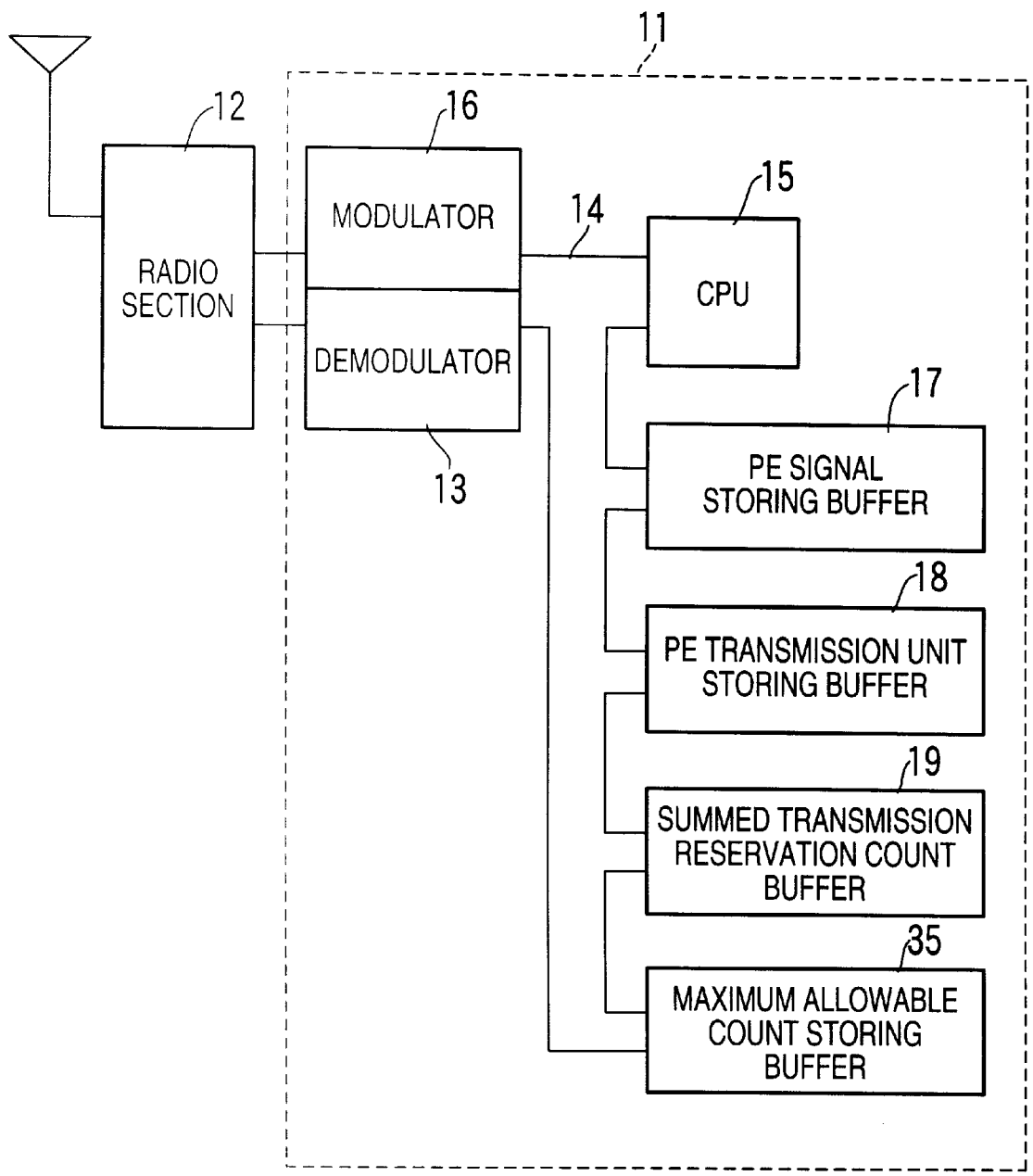
FIG. 8 is a block diagram illustrating the structure of a base station apparatus 1 according to a second embodiment of the present invention.

FIG. 8 is a block diagram illustrating the structure of a base station apparatus 1 in a second embodiment of the present invention. In this base station apparatus 1, a maximum allowable reservation count storing buffer 35 is provided in a transmission/reception control section 11. In the present invention, since the maximum allowable reservation count depends on the traffic of mobile stations 3 and the transmission request count of long burst transmissions, an ideal value of the maximum allowable reservation count is determined based on the communication situation after the start of a system service. For this reason, if the base station apparatus 1 has the maximum allowable reservation count as a fixed value, change of the maximum allowable reservation count must be coped with exchanging a software executed by the CPU 15. For this reason, in this embodiment, the maximum allowable reservation count storing buffer 35 is provided in the transmission/reception control section 11 to store a specified value in accordance with an instruction from a host device. The CPU 15 uses the maximum allowable reservation count stored in the maximum allowable reservation count storing buffer 35 in the transmitting process.

According to this embodiment, the maximum allowable transmission reservation count is set in the maximum allowable reservation count storing buffer 35 provided in the transmission/reception control section 11 on and after the start of the service. Accordingly, the CPU 15 can recognize this maximum allowable transmission reservation count when executing the transmitting process. Thus, even when the maximum allowable reservation count is changed because of the increase of the subscribers of the mobile stations 3, it is possible to attain a new effect without exchanging the software to be executed by the CPU 15.

As explained above, the mobile station starts the radio channel connection failure timer after the short burst transmission. The retransmission process is executed, if the PE signal is not received through the downward control channel, until this radio channel connection failure timer is set to the time-out state. There is a case that the traffic is increased since each mobile station frequently transmits a short burst transmission to the base station apparatus 1 or since the number of long burst transmissions to be transmitted is large. In this case, the reception of the PE signal is delayed depending on the mobile station, so that the radio channel connection failure timer may be set to the time-out state. Thus, the retransmission process is executed.

However, according to the present invention, the base station apparatus 1 transmits the PE signal for every unit alternately or sequentially to the respective mobile station under the transmission reservation management of the long burst transmission. Therefore, according to the present invention, even if the traffic is increased, it is possible to prevent the radio channel connection failure timer of the mobile station from being set to the time-out state. Thus, it is possible to avoid the retransmission process in the mobile stations. As a result, the increase of the traffic on the upward control channel can be suppressed due to the retransmission process in the mobile stations. Also, as the result of the above-mentioned suppression of the retransmission process resulting from the upward control channel, the occurrence of the transmission disabled unit in the upward control channel can be eliminated. As a result, the reduction of the transmission ability of the upward control channel can be prevented.

What is claimed is:

1. A mobile satellite communication system comprising:

a plurality of mobile stations; and a base station apparatus connected to said plurality of mobile stations through a communication satellite, for performing transmission to said plurality of mobile stations using a single downward control channel and reception from said plurality of mobile stations using a single upward control channel, and wherein said plurality of mobile stations are requesting mobile stations that perform short burst transmissions on the upward control channel requesting a number of long burst transmissions, and wherein said base station apparatus comprises:

a partial echo (PE) signal buffer that stores an identifier for each of said requesting mobile stations when said requesting mobile stations request long burst transmissions, said identifier being contained in a PE signal;

a PE signal transmission count buffer that stores said number of long burst transmissions as a transmission count related to each of said requesting mobile stations;

a transmission reservation count storing buffer that stores a number of said requesting mobile stations as a transmission reservation count, said transmission reservation count being updated in response to said short burst transmissions requesting long burst transmissions; and a control unit that transmits a collision control signal to the plurality of mobile stations in the downward control channel including said PE signal based on a maximum allowable transmission reservation count and said transmission reservation count in response to said short burst transmissions requesting long burst transmissions.

2. The mobile satellite communication system according to claim 1, further comprising a maximum allowable transmission reservation count buffer for storing said maximum allowable transmission reservation count, and wherein said control unit reads out said maximum allowable transmission reservation count from said maximum allowable transmission reservation count buffer and transmits said collision control signal, based on the maximum allowable transmission reservation count and said transmission reservation count.

3. The mobile satellite communication system according to claim 1, wherein when said control unit transmits said collision control signal for one of said requesting mobile stations, said control unit decrements said transmission count related to the one requesting mobile station by "1".

4. The mobile satellite communication system according to claim 1, wherein said control unit decrements said transmission count by "1" when said collision control signal is repeatedly transmitted to one of said requesting mobile stations related to said transmission count.

5. The mobile satellite communication system according to claim 1, wherein said control unit transmits said collision control signal including said PE signal for one of said requesting mobile stations determined based on said maximum allowable transmission reservation count and said transmission reservation count in response to said short burst transmissions requesting long burst transmissions.

6. The mobile satellite communication system according to claim 1, wherein when said transmission reservation count is smaller than said maximum allowable transmission reservation count, said control unit transmits said collision control signal, including said PE signal, for one of said requesting mobile stations repeatedly for a number of times equal to said transmission count.

7. The mobile satellite communication system according to claim 1, wherein when said transmission reservation count is equal to or larger than said maximum allowable transmission reservation count, said control unit transmits said collision control signal for each of said requesting mobile stations circularly, rotating through said requesting mobile stations according to said identifier for each of said requesting mobile stations stored in said partial echo (PE) buffer, during consecutive transmission time units.

8. The mobile satellite communication system according to claim 1, wherein each of said plurality of mobile stations includes a corresponding timer which places a corresponding mobile station into a time-out state in a predetermined number of transmission time units, and wherein an allowable number of said requesting mobile stations is determined based on a communication delay time between said base station apparatus and said plurality of mobile stations and based on said predetermined number of transmission time units of said timer.

9. A method of transmitting data from each of a plurality of mobile stations to a base station apparatus through a communication satellite in a mobile satellite communication system, wherein transmission from said base station apparatus to said plurality of mobile stations is performed using a single downward control channel and transmission from said plurality of mobile stations to said base station apparatus is performed using a single upward control channel, said method comprising the steps of:

performing a requesting short burst transmission requesting long burst transmissions from each of requesting ones of said plurality of mobile stations to said base station apparatus;

updating a transmission reservation count and a transmission count in response to said requesting short burst transmission;

transmitting a collision control signal including a partial echo (PE) signal from said base station apparatus to said requesting mobile stations for one or more long burst transmissions, a number of said long burst transmissions being stored as a transmission count for each of said requesting mobile stations, based on a maximum allowable transmission reservation count and based on said transmission reservation count in response to said requesting short burst transmission, said PE signal including an identifier of one of said requesting mobile stations; and transferring said data from each of said requesting mobile stations to said base station apparatus according to the collision control signal.

10. The method according to claim 9, further comprising the step of storing a maximum allowable transmission reservation count, and wherein said transmitting step includes:

reading out said maximum allowable transmission reservation count; and transmitting said collision control signal based on the maximum allowable transmission reservation count and based on said transmission reservation count.

11. The method according to claim 9, wherein said transmitting step includes:

decrementing the transmission count for one of said requesting mobile stations by "1" each time the collision control signal is transmitted for the one of said requesting mobile stations.

12. The method according to claim 9, wherein said transmitting step includes:

decrementing said transmission reservation count by "1" each time said collision control signal is transmitted for one of said requesting mobile stations.

13. The method according to claim 9, wherein said transmitting step includes:

transmitting said collision control signal including said PE signal for one of said requesting mobile stations based on said maximum allowable transmission reservation count and based on said transmission reservation count in response to said requesting short burst transmission.

14. The method according to claim 9, wherein said transmitting step includes:

transmitting said collision control signal including said PE signal for one of said requesting mobile stations repeatedly for a number of times equal to said transmission count when said transmission reservation count is less than said maximum allowable transmission reservation count.

15. The method according to claim 9, wherein said transmitting step includes:

transmitting said collision control signal for each of said requesting mobile stations circularly, rotating through said requesting mobile stations according to said identifier for each of said requesting mobile stations stored in said partial echo (PE) buffer, during consecutive transmission time units when said transmission reservation count is equal to or larger than said maximum allowable transmission reservation count.

16. The method according to claim 9, wherein each of said plurality of mobile stations includes a corresponding timer which places a corresponding mobile station into a time-out state in a predetermined number of transmission time units, and wherein an allowable number of said requesting mobile stations is determined based on a communication delay time between said base station apparatus and said plurality of mobile stations and based on said predetermined number of transmission time units of said timer.

* * * * *